United States Patent
Huang et al.

(10) Patent No.: US 11,570,290 B2
(45) Date of Patent: Jan. 31, 2023

(54) MOBILE TERMINAL

(71) Applicant: HUAWEI TECHNOLOGIES CO., LTD., Guangdong (CN)

(72) Inventors: Bo Huang, Guangdong (CN); Weihua Mao, Guangdong (CN); Peng Zha, Guangdong (CN); Haowen Xu, Guangdong (CN)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 24 days.

(21) Appl. No.: 17/271,293

(22) PCT Filed: Aug. 27, 2018

(86) PCT No.: PCT/CN2018/102537
§ 371 (c)(1),
(2) Date: Feb. 25, 2021

(87) PCT Pub. No.: WO2020/041940
PCT Pub. Date: Mar. 5, 2020

(65) Prior Publication Data
US 2021/0344785 A1 Nov. 4, 2021

(51) Int. Cl.
*H04M 1/00* (2006.01)
*H04M 1/02* (2006.01)
*G06F 1/16* (2006.01)
*H04N 5/225* (2006.01)

(52) U.S. Cl.
CPC ........ *H04M 1/0268* (2013.01); *G06F 1/1652* (2013.01); *H04M 1/0214* (2013.01); *H04M 2250/16* (2013.01); *H04N 5/2257* (2013.01)

(58) Field of Classification Search
CPC ............. H04M 1/0268; H04M 1/0214; H04M 2250/16; G06F 1/1652; H04N 5/2257
See application file for complete search history.

(56) References Cited

U.S. PATENT DOCUMENTS

| | | |
|---|---|---|
| 2010/0273531 A1 | 10/2010 | Hu |
| 2016/0334836 A1 | 11/2016 | Hong et al. |
| 2017/0006725 A1 | 1/2017 | Ahn et al. |

(Continued)

FOREIGN PATENT DOCUMENTS

| | | |
|---|---|---|
| CN | 202455400 U | 9/2012 |
| CN | 202602738 U | 12/2012 |

(Continued)

*Primary Examiner* — Nhan T Le
(74) *Attorney, Agent, or Firm* — Conley Rose, P.C.

(57) ABSTRACT

A mobile terminal includes a first display system, a second display system, and a foldable support frame. The support frame includes a first support frame, a second support frame, and a bending structure coupled to the first support frame and the second support frame. The first display system and the second display system are separately arranged on two opposite sides of the support frame. The support frame further includes a side frame fixedly coupled to the first support frame or the second support frame. After the first support frame and the second support frame are folded using the bending structure, the side frame is exposed outside an overlapping area of the first support frame and the second support frame. In addition, a sensor component is disposed on the side frame.

20 Claims, 6 Drawing Sheets

(56) References Cited

U.S. PATENT DOCUMENTS

| | | |
|---|---|---|
| 2017/0082784 A1 | 3/2017 | Niu |
| 2017/0104855 A1 | 4/2017 | Lee et al. |
| 2018/0054501 A1 | 2/2018 | Lin |
| 2020/0021675 A1* | 1/2020 | Cheng ................. H04M 1/0214 |

FOREIGN PATENT DOCUMENTS

| | | |
|---|---|---|
| CN | 203014919 U | 6/2013 |
| CN | 203278907 U | 11/2013 |
| CN | 104796504 A | 7/2015 |
| CN | 105516410 A | 4/2016 |
| CN | 105516411 A | 4/2016 |
| CN | 105900037 A | 8/2016 |
| CN | 106328007 A | 1/2017 |
| CN | 106790829 A | 5/2017 |
| CN | 108140930 A | 6/2018 |
| EP | 3001650 A2 | 3/2016 |
| EP | 3035152 A1 | 6/2016 |

\* cited by examiner

MOBILE TERMINAL

CROSS-REFERENCE TO RELATED APPLICATIONS

This application is a U.S. National Stage of International Patent Application No. PCT/CN2018/102537 filed on Aug. 27, 2018, which is hereby incorporated by reference in its entirety.

TECHNICAL FIELD

This application relates to the field of mobile terminal technologies, and in particular, to a mobile terminal.

BACKGROUND

With popularization of intelligent terminals, implementing a higher screen-to-body ratio is always a research direction of all major mobile phone manufacturers. On one hand, a user requires convenience of carrying a mobile phone, and on the other hand, the user requires a display feature of a large screen. Based on the two requirements, a foldable mobile phone becomes a very popular development direction. However, a foldable mobile terminal designed in the prior art has a relatively large overall thickness because of a camera module.

SUMMARY

This application provides a mobile terminal, to reduce a thickness of the mobile terminal and improve convenience of using the mobile terminal.

According to a first aspect, a mobile terminal is provided, where the mobile terminal includes a first display module and a second display module, and the first display module is a foldable flexible display module. In addition, the mobile terminal further includes a support frame, and the support frame is a foldable support frame and specifically includes three parts: a first support frame, a second support frame, and a bending structure. The first support frame and the second support frame are separately arranged on two sides of the bending structure, and the first support frame and the second support frame are separately connected to the bending structure. The bending structure is used as a connector to implement folding between the first support frame and the second support frame. When the first display module and the second display module are fastened on the support frame, the first display module is fastened on one side of the first support frame and one side of the second support frame, and covers the first support frame and the second support frame. The second display module is fastened on a side, of the first support frame or the second support frame, away from the first display module. That is, the first display module and the second display module are separately arranged on two opposite sides of the support frame. In addition, the support frame further includes a side frame, and the side frame is fixedly connected to the first support frame or the second support frame. In addition, the side frame protrudes outside the folded first support frame and second support frame. After the first support frame and the second support frame are folded by using the bending structure, the side frame is exposed outside an overlapping area of the first support frame and the second support frame. In addition, a sensor component is disposed on the side frame. It can be learned from the foregoing description that the sensor component is disposed on the protruding side frame, so that a thickness of the entire mobile terminal can be reduced, and the sensor component is disposed on the side frame and does not protrude outside the entire mobile terminal, thereby improving safety of the sensor component.

When the side frame is specifically disposed, to ensure that the sensor component does not protrude outside the entire mobile terminal, a thickness of the side frame is greater than a thickness of the first support frame, and is less than a thickness of the folded first support frame and second support frame in a direction in which the first display module points to the second display module. That is, after the first support frame and the second support frame are folded, the thickness of the side frame is less than the thickness of the folded first support frame and second support frame, so that space is reserved for the sensor component in a thickness direction.

In a specific implementation, a hollow structure is disposed on the side frame, and the sensor component is embedded into the hollow structure. Therefore, the safety of the sensor component is further improved. In addition, another structure such as a groove may be used in addition to the hollow structure.

When the sensor component is specifically disposed, different components may be included, for example, sensor components of different functions such as a camera, an earpiece, distance sensing, environment sensing, and biometric recognition. The sensor component specifically disposed on the side frame may include one or a combination of several of the foregoing components.

In addition, when the hollow structure is specifically disposed, to facilitate disposing of the sensor component, the hollow structure is a long waist-shaped hollow structure, and a length direction of the hollow structure is the same as a length direction of the side frame. Therefore, the hollow structure is disposed along the length direction of the side frame, so that there is enough space to dispose the sensor component.

When the sensor component is specifically disposed, the sensor component includes a first sensor component and/or a second sensor component, the first sensor component and the first display module are located on a same side, and the second sensor component and the second display module are located on a same side. That is, the first sensor component and the second sensor component are separately disposed on two opposite sides of the side frame. In addition, when this structure is used, and the first sensor component and the second sensor component each include a camera, configuration of the camera can reach configuration of a rear-facing camera in the prior art because there is no space limitation.

In a specific implementation, a controller is further included. When the first support frame and the second support frame are folded, the controller controls the first sensor component to connect to the second display module, and controls the second sensor component to connect to the second display module. The controller is a mainboard of the mobile terminal. When the mobile terminal is folded, the mainboard controls the first sensor component and the second sensor component to connect to the second display module, so as to control the first sensor component and the second sensor component by using the second display module, so that the sensor components can be controlled without unfolding a folded structure of the mobile terminal.

Both the first sensor component and the second sensor component include a display screen and a touchscreen, so that the sensor components can be controlled by using the first display module and the second display module.

In a specific implementation, the mobile terminal further includes auxiliary components disposed on the side frame, and the auxiliary components may be flashes.

In specific disposing, the auxiliary components include a first auxiliary component on a same side as the first display module and a second auxiliary component on a same side as the second display module. That is, the side frame is used to support the auxiliary components. In specific disposing, the auxiliary components may alternatively be disposed in the hollow structure.

In a specific implementation, the side frame is integrated with the first support frame or the second support frame. Certainly, the first support frame, the second support frame, and the side frame may alternatively be independent structures.

In a specific implementation, the mobile terminal further includes a speaker, and the speaker is disposed on the side frame.

In a specific implementation, the mobile terminal further includes a battery component, the battery component includes a first battery and a second battery, the first battery is disposed in the first support frame, and the second battery is disposed in the second support frame. Therefore, a standby time of the mobile terminal is increased.

When the side frame is specifically disposed, different manners may be used. For example, in one manner, the first support frame is a rectangular frame. In addition, in two long sides of the first support frame, one long side is connected to the side frame, and the other long side is connected to the bending structure. In another implementation, the first support frame is a rectangular frame, one long side of the first support frame is connected to the bending structure, and one short side is connected to the side frame. That is, the side frame may be disposed on different sides of the first support frame or the second support frame.

When the bending structure is specifically disposed, the bending structure may enable the mobile terminal to open at a specified angle.

DESCRIPTION OF EMBODIMENTS

To make the objectives, technical solutions, and advantages of this application clearer, the following further describes this application in detail with reference to the accompanying drawings.

First, a foldable mobile terminal is described. The foldable mobile terminal includes two display screens, which are respectively an inner screen and an outer screen. The inner screen may be folded. When the mobile terminal is folded, the outer screen is exposed, and the inner screen is folded. To improve use effects, an existing mobile terminal includes a camera function and is equipped with a front-facing camera and a rear-facing camera. When the mobile terminal uses a foldable structure, the cameras protrude outside the entire mobile terminal. This affects a thickness of the entire mobile terminal. It can be seen from a mobile terminal shown in FIG. 1 that, disposed cameras (a front-facing camera 2 and a rear-facing camera 3) protrude outside a housing 1 of the mobile terminal. This increases a thickness of the entire mobile terminal when the mobile terminal is folded, and the exposed cameras are vulnerable to damage.

Figure 2:
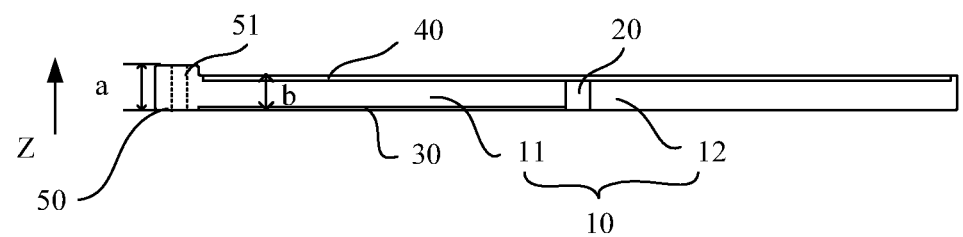
FIG. 2 is a side view of a mobile terminal being unfolded according to an embodiment of this application.

A mobile terminal disclosed in this application is also a foldable mobile terminal. As shown in FIG. 2, the mobile terminal includes a first display module 40 and a second display module 30, where the first display module 40 is an inner screen, and the second display module 30 is an outer screen. In specific disposing, the first display module 40 needs to be folded. Therefore, the first display module 40 uses a flexible display module, so that the first display module 40 can be bent when the mobile terminal is folded. Both a first sensor component 61 and a second sensor component 62 include a display screen and a touchscreen, so as to implement a touch operation.

Figure 3:
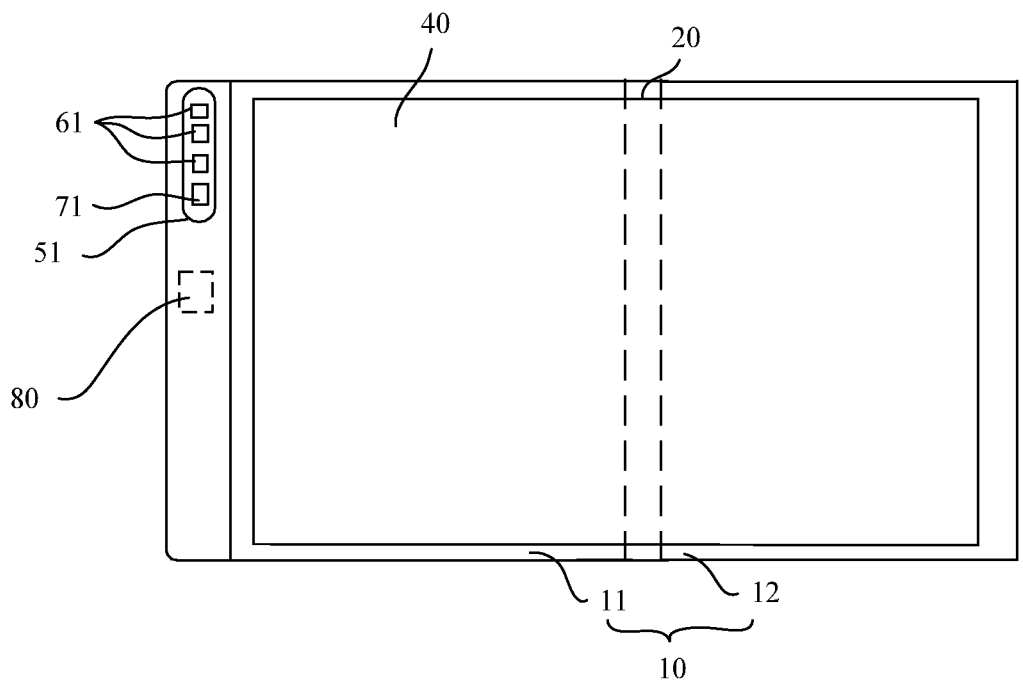
FIG. 3 is a top view of a mobile terminal being unfolded according to an embodiment of this application.

When the first display module 40 and the second display module 30 are specifically fastened, a support frame 10 is used to fasten the first display module 40 and the second display module 30. FIG. 2 and FIG. 3 show that a specific support frame 10 supports the first display module 40 and the second display module 30. A main structure of the support frame 10 includes three parts: a first support frame 11, a second support frame 12, and a bending structure 20. The first support frame 11 and the second support frame 12 are symmetrically arranged on two sides of the bending structure 20 separately, and the first support frame 11 and the second support frame 12 are separately connected to the bending structure 20. In the structure shown in FIG. 2, both the first support frame 11 and the second support frame 12 are rectangular frames. It should be understood that the rectangular frame is merely an example. The first support frame 11 and the second support frame 12 may alternatively use frames of other shapes, such as elliptical or rhombic frames. As a connector, the bending structure 20 can implement relative rotation between the first support frame 11 and the second support frame 12. If the bending structure 20 is a shaft, the first support frame 11 and the second support frame 12 are rotatably connected by using the shaft. Alternatively, if the bending structure 20 is a flexible plate such as a rubber plate, the first support frame 11 and the second support frame 12 may rotate relative to each other through deformation of the rubber plate. Certainly, the bending structure 20 may alternatively be another part that can implement relative rotation between the first support frame 11 and the second support frame 12 in the prior art, which is not listed one by one herein.

When the support frame 10 supports the first display module 40 and the second display module 30, the first display module 40 is fastened on one side of the first support frame 11 and one side of the second support frame 12, and covers the first support frame 11 and the second support frame 12. The second display module 30 is fastened on a side, of the first support frame 11 or the second support frame 12, away from the first display module 40. As shown in FIG. 2, the first display module 40 and the second display module 30 are separately arranged on two opposite sides of the first support frame 11. When the mobile terminal is unfolded, the first support frame 11 and the second support frame 12 are unfolded flat or at a specified angle. A placement direction of the mobile terminal shown in FIG. 2 is used as a reference direction, and along a Z direction, the first display module 40 is located above the support frame 10, and the second display module 30 is located below the support frame 10. When the mobile terminal is folded, the first support frame 11 and the second support frame 12 are folded by using a placement direction of the mobile terminal shown in FIG. 4 as a reference direction. In this case, the first display module 40 is folded between the first support frame 11 and the second support frame 12, and the second display module 30 is exposed outside the mobile terminal.

Figure 4:
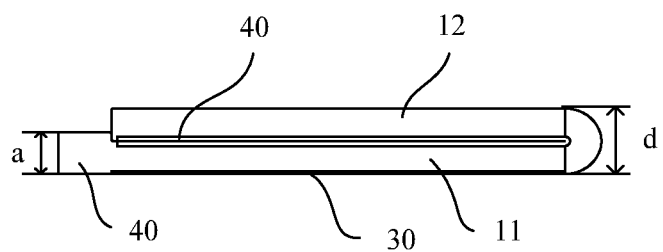
FIG. 4 is a side view of a mobile terminal being folded according to an embodiment of this application.
Figure 8:
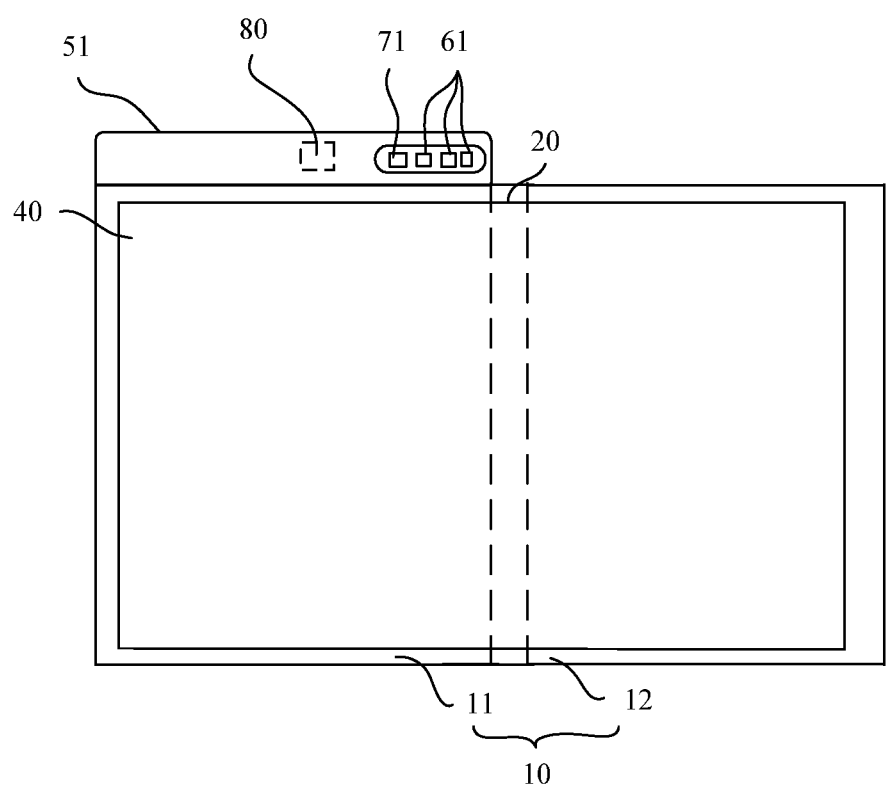
FIG. 8 is a schematic structural diagram of another mobile terminal according to an embodiment of this application.

In the mobile terminal provided in this embodiment of this application, a sensor component is also disposed, and the sensor component includes but is not limited to a camera. For example, the sensor component may be one or a combination of several of sensor components of different functions, such as a camera, an earpiece, distance sensing, environment sensing, and biometric recognition. To prevent the sensor component from affecting a thickness of the mobile terminal when the sensor component is disposed, as shown in FIG. 2 and FIG. 4, the mobile terminal provided in this embodiment of this application is provided with a side frame 50. When the side frame 50 is specifically disposed, the side frame 50 may be connected to either one of the first support frame 11 and the second support frame 12. The side frame 50 is connected to the first support frame 11 and the second support frame 12 in a same manner. The following uses an example in which the side frame 50 is connected to the first support frame 11 for description. The first support frame 11 is a rectangular frame, and has two opposite long sides and two opposite short sides. One of the long sides is connected to the bending structure 20, and the other long side is fixedly connected to the side frame 50, that is, the bending structure 20 and the side frame 50 are separately arranged on two sides of the first support frame 11. For details, refer to the structure in FIG. 2. Certainly, another manner may alternatively be used. As shown in FIG. 8, the side frame 50 is fixedly connected to a short side of the first support frame 11. In this case, one long side of the first support frame 11 is connected to the bending structure 20, and one of the two short sides is fixedly connected to the side frame 50. Certainly, in a transformation manner, a short side of the first support frame may alternatively be connected to the bending structure 20, and any side of the three sides (one short side and two long sides) that are not connected to the bending structure 20 is fixedly connected to the side frame 50. It may be learned from the foregoing description that, when the side frame 50 is connected to the first support frame 11, the side frame 50 may be fixedly connected to any side of the first support frame 11 that is not connected to the bending structure 20.

Still referring to FIG. 2, when the side frame 50 is fixedly connected to the first support frame 11 or the second support frame 12, correspondingly the second display module 30 is also fixedly connected to the support frame. As shown in FIG. 4, when the side frame 50 is fixedly connected to the first support frame 11, the second display module 30 is also fixedly connected to the first support frame 11. Certainly, a structure shown in FIG. 7 may alternatively be used. The second display module 30 is disposed on the second support frame 12, and the side frame 50 is disposed on the first support frame 11.

When the side frame 50 is specifically fixedly connected to the first support frame 11 and the second support frame 12, different forms may be used. Separate structures may be used for the side frame 50 and the first support frame 11 or the second support frame 12: The side frame 50 may be fixedly connected to the first support frame 11 or the second support frame 12 by using a connector. The connector may be a connecting piece such as a screw, a bolt, or a buckle, or the fixed connection is implemented in an adhesive or welding manner. Certainly, an integrated structure may alternatively be used for the side frame 50 and the first support frame 11 or the second support frame 12. That is, when the first support frame 11 or the second support frame 12 is prepared, the side frame 50 is prepared at the same time.

Referring to FIG. 2 and FIG. 4 and by using the placement direction of the mobile terminal as a reference direction, for the side frame 50, a thickness (along the Z direction) of the side frame 50 needs to meet a specific requirement. To ensure that the sensor component does not protrude outside the entire mobile terminal, the thickness of the side frame 50 is greater than a thickness of the first support frame 11, and is less than a thickness of the folded first support frame 11 and second support frame 12 along a direction (Z direction) in which the first display module 40 points to the second display module 30. FIG. 2 is used as an example. It may be seen from FIG. 2 that the thickness a of the side frame 50 is greater than the thickness of the first support frame 11, and a position at which the side frame 50 is connected to the first support frame 11 uses an arc transition manner. In this case, it may be seen that the first support frame 11 and the side frame 50 enclose a depressed area, and the depressed area is corresponding to the second support frame 12. When the mobile terminal is folded, as shown in FIG. 4, the second support frame 12 is located in the depressed area, and the side frame 50 is exposed outside an overlapping area of the first support frame 11 and the second support frame 12. In addition, the thickness a of the side frame 50 is less than the thickness d of the folded first support frame 11 and second support frame 12. Therefore, space is reserved for the sensor component in a thickness direction. In addition, in this manner, it is also convenient for the mobile terminal to change from a folded state to an unfolded state.

When the sensor component is disposed, a hollow structure 51 is disposed on the side frame 50, and the sensor component is embedded into the hollow structure 51. It may be seen from FIG. 2 and FIG. 3 that, when the hollow structure 51 is specifically disposed, the side frame 50 is hollowed out along the Z direction, and a long waist-shaped hollow structure 51 is formed. In addition, a length direction of the hollow structure 51 is consistent with a length direction of the side frame 50, so that the hollow structure 51 is disposed along the length direction of the side frame 50, and there is enough space to dispose the sensor component. In specific disposing, the sensor component may be directly disposed in the hollow structure 51. It should be understood that the hollow structure 51 is only a specific structure for disposing the sensor component, and the sensor component may alternatively be disposed in another manner, for example, by using a common structure for accommodating a component, such as a groove or a notch.

When the sensor component is disposed, the sensor component may be partially exposed outside the hollow structure 51 when the hollow structure 51 is disposed. However, it should be understood that a height of the exposed part of the sensor component needs to be lower than a height of the folded first support frame 11 and second support frame 12, thereby avoiding protruding of the sensor component.

Figure 5:
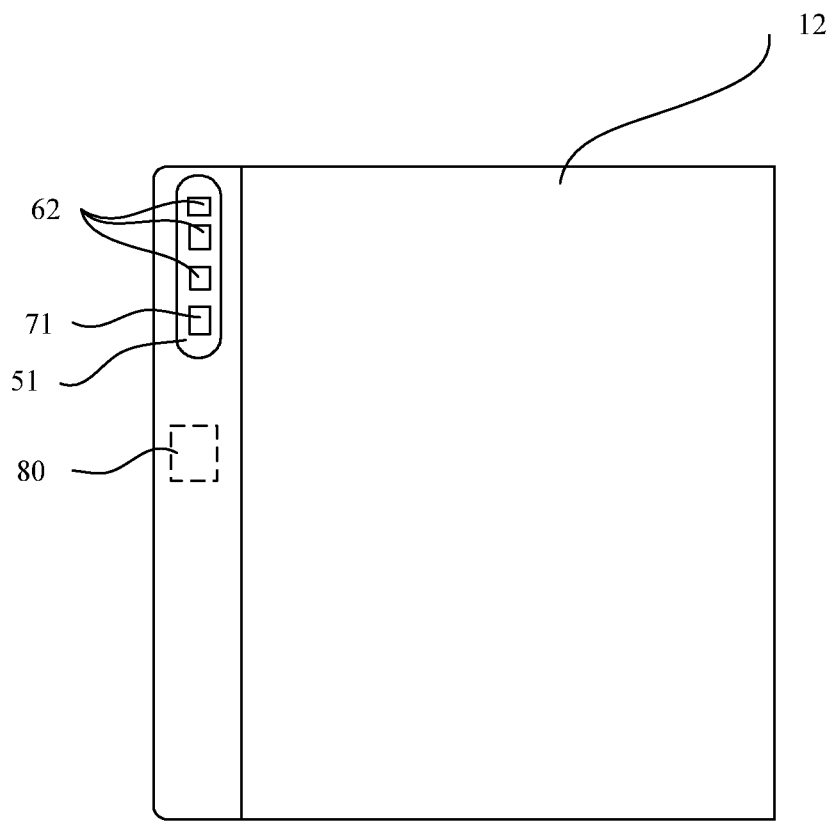
FIG. 5 is a top view of a mobile terminal being folded according to an embodiment of this application.
Figure 6:
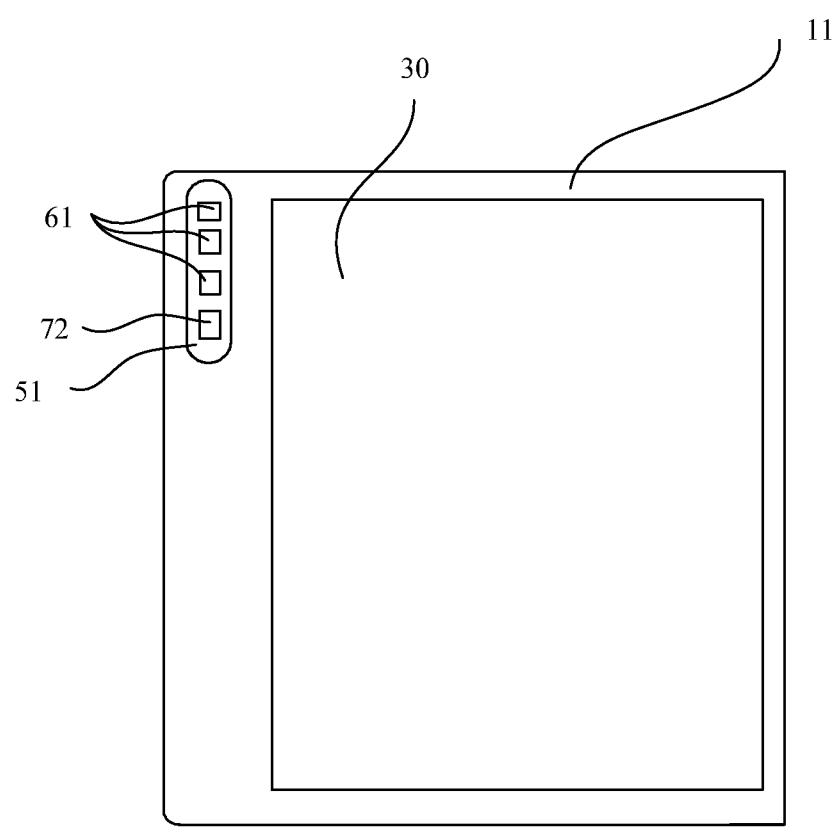
FIG. 6 is a bottom view of a mobile terminal being folded according to an embodiment of this application.

The sensor component in this application may include one group of sensor components, or may include two groups of sensor components. In addition, each group of sensor components may be one or a combination of several of sensor components of different functions, such as a camera, an earpiece, distance sensing, environment sensing, and biometric recognition. In a specific implementation, as shown in FIG. 5 and FIG. 6, the sensor component includes two sensor components: a first sensor component 61 and a second sensor component 62. As shown in FIG. 3 and FIG. 6, the first sensor component 61 and the first display module 40 are located on a same side, that is, a sensing end of the first sensor component 61 and the first display module 40 are located on a same side of the support frame 10. As shown in FIG. 5, the second sensor component 62 and the second display module 30 are located on a same side, that is, the second sensor component 62 and the second display module 30 are located on the other side of the support frame 10. In addition, because the first sensor component 61 and the second sensor component 62 are separately disposed by using the side frame 50, there is enough space to dispose the first sensor component 61 and the second sensor component 62. When the first sensor component 61 and the second sensor component 62 include a camera, a size of the camera may be the same as a size of a rear-facing camera of a mobile terminal in the prior art. Therefore, a photographing effect can be effectively improved.

Figure 1:
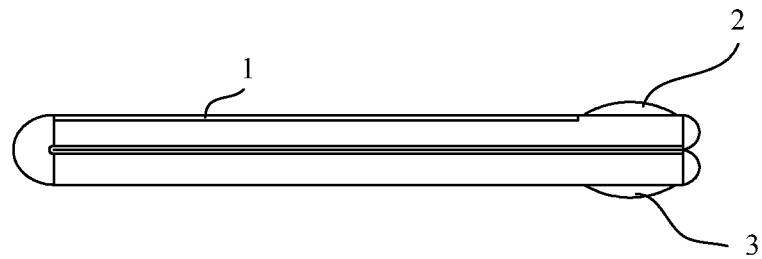
FIG. 1 is a schematic structural diagram of a mobile terminal in the prior art.
Figure 7:
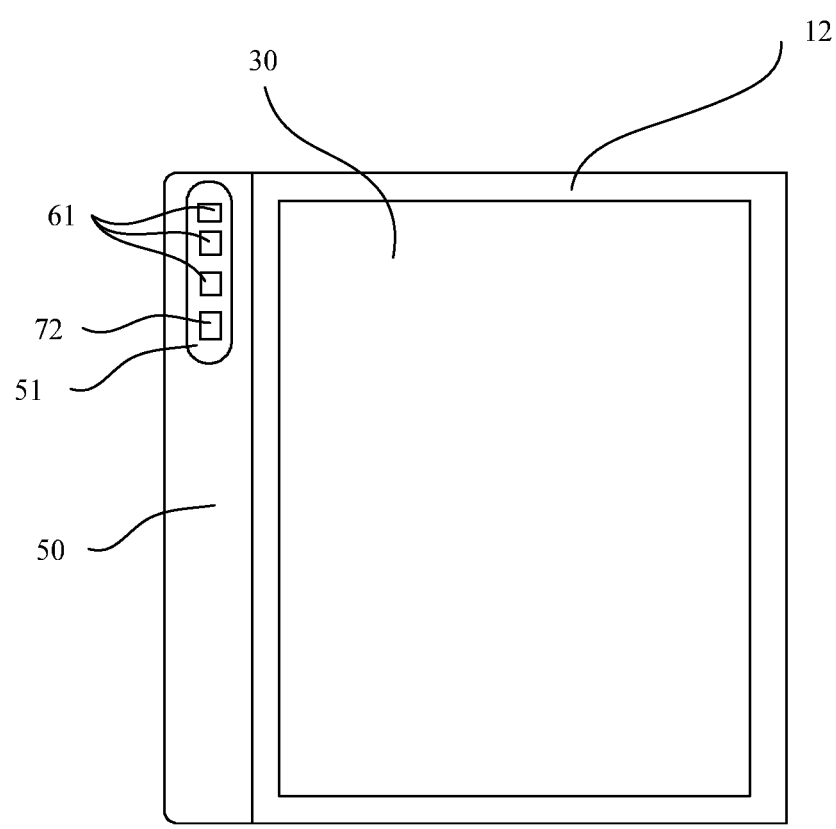
FIG. 7 is a schematic diagram of another mobile terminal being folded according to an embodiment of this application.

When both the first sensor component 61 and the second sensor component 62 include a camera, and the mobile terminal is folded or unfolded, cameras in different sensor components are used as a front-facing camera and a rear-facing camera. For example, when the mobile terminal is folded, the camera of the first sensor component 61 is used as the rear-facing camera, and the camera of the second sensor component 62 is used as the front-facing camera. In specific disposing, a controller is used for control. As shown in FIG. 7, the controller 100 is disposed in the support frame, and may be either in the first support frame 11 or in the second support frame 12. In this case, when the first support frame 11 and the second support frame 12 are folded, the controller 100 controls the first sensor component 61 to connect to the second display module 30, and controls the second sensor component 62 to connect to the second display module 30. The controller 100 is a mainboard of the mobile terminal. When the mobile terminal is folded, the mainboard controls the first sensor component 61 and the second sensor component 62 to connect to the second display module 30, so as to control the first sensor component 61 and the second sensor component 62 by using the second display module 30, so that the sensor components can be controlled without unfolding a folded structure of the mobile terminal. When the mobile terminal is unfolded, the camera of the first sensor component 61 may be used as the front-facing camera, and the camera of the second sensor component 62 may be used as the rear-facing camera. Referring to FIG. 1 together, it may be seen from FIG. 1 that, in the prior art, the front-facing camera 2 and the rear-facing camera 3 in the foldable mobile terminal can be used to take a selfie only when the mobile terminal is folded. When the mobile terminal is unfolded, because the front-facing camera 2 and the rear-facing camera 3 are located on a same side, a selfie cannot be taken. However, in the technical solution disclosed in this application, because the first sensor component 61 and the second sensor component 62 are located on the side frame 50, a selfie can be taken regardless of whether the mobile terminal is in a folded state or in an unfolded state.

Certainly, in addition to being used a bearing member of the sensor component, the side frame 50 may be further used to bear another component. For example, when the mobile terminal includes an auxiliary component, the auxiliary component may also be disposed on the side frame 50. Certainly, the auxiliary component may alternatively be disposed in the hollow structure 51, a groove, or a notch used to bear the sensor component. The auxiliary component may be specifically a flash or another auxiliary component.

As shown in FIG. 5 and FIG. 6, when the auxiliary component is specifically disposed, there may be one or two auxiliary components, similar to the sensor component. When two auxiliary components exist: a first auxiliary component 71 and a second auxiliary component 72, the first auxiliary component 71 and the first display module 40 are located on a same side, that is, a sensing end of the first auxiliary component 71 and the first display module 40 are located on a same side of the support frame 10. The second auxiliary component 72 and the second display module 30 are located on a same side, that is, the second auxiliary component 72 and the second display module 30 are located on the other side of the support frame 10. In addition, because the first auxiliary component 71 and the second auxiliary component 72 are separately disposed by using the side frame 50, there is enough space to dispose the first auxiliary component 71 and the second auxiliary component 72.

Certainly, a speaker 80 of the mobile terminal may also be disposed in the side frame 50. Specifically, the speaker 80 is built into the side frame 50, and a sound outlet corresponding to the speaker 80 is disposed on the side frame 50.

Figure 9:
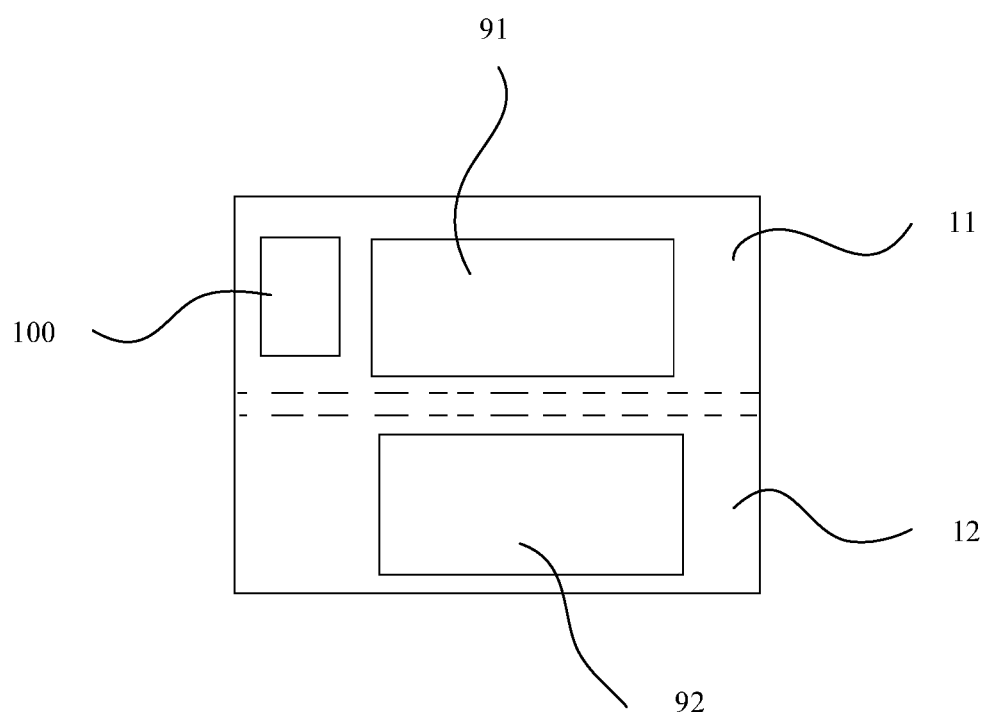
FIG. 9 is an internal structural block diagram of a mobile terminal according to an embodiment of this application.

In addition, in the mobile terminal in this embodiment of this application, when two support frames are used, each support frame may be equipped with a battery component. Specifically, as shown in FIG. 9, the battery component includes a first battery 91 and a second battery 92, where the first battery 91 is disposed in the first support frame 11, and the second battery 92 is disposed in the second support frame 12, thereby increasing a battery capacity of the mobile terminal and further increasing a standby time of the mobile terminal.

It may be learned from the foregoing description that, in the mobile terminal provided in this embodiment of this application, the disposed side frame 50 is used as a support component, so that the disposed camera can be prevented from protruding outside the mobile terminal, an installation environment of the camera is improved, and a risk of damaging the camera is lowered. In addition, the thickness of the mobile terminal is also reduced when the mobile terminal is folded. The sensor component is borne by using the side frame and can be well applied when the mobile terminal is folded or unfolded, thereby improving convenience of the mobile terminal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mobile terminal comprising:
a foldable support frame comprising:
a bending structure comprising:
a first side; and
a second side;
a first support frame coupled to the bending structure and arranged on the first side, wherein the first support frame comprises:
a third side; and
a fourth side;
a second support frame coupled to the bending structure and arranged on the second side, wherein the second support frame comprises:
a fifth side; and
a sixth side;
a side frame fixedly coupled to the first support frame or the second support frame, wherein the side frame is exposed outside an overlapping area of the first support frame and the second support frame when the first support frame and the second support frame are folded using the bending structure;
a first display system disposed on the third side and the fifth side, wherein the first display system is a foldable flexible display system;
a second display system disposed on the fourth side or the sixth side and away from the first display system; and
a sensor component disposed on the side frame,
wherein a first thickness of the side frame is greater than a second thickness of the first support frame, and wherein the first thickness is less than a third thickness of a folded first support, frame and second support frame in a direction in which the first display system points to the second display system.

2. The mobile terminal of claim 1, wherein the side frame comprises a hollow structure, and wherein the sensor component is disposed in the hollow structure.

3. The mobile terminal of claim 2, wherein the hollow structure comprises an elongated hollow structure, and wherein a first length direction of the hollow structure extends along a second length direction of the side frame.

4. The mobile terminal of claim 1, wherein the sensor component comprises:
a first sensor component located on the third side; and
a second sensor component located on the fourth side or the sixth side.

5. The mobile terminal of claim 4, further comprising a controller, wherein when the first support frame and the second support frame are folded, the controller is configured to:
control the first sensor component to connect to the second display system; and
control the second sensor component to connect to the second display system.

6. The mobile terminal of claim 4, wherein the first sensor component located on the third side protrudes from the third side, and wherein the second sensor component located on the fourth side or the sixth side protrudes from the fourth side or the sixth side, respectively.

7. The mobile terminal of claim 1, wherein the sensor component comprises a first sensor component located on the third side.

8. The mobile terminal of claim 7, further comprising a controller configured to control the first sensor component to connect to the second display system when the first support frame and the second support frame are folded.

9. The mobile terminal of claim 1, wherein the sensor component comprises a second sensor component located on the fourth side or the sixth side.

10. The mobile terminal of claim 9, further comprising a controller configured to control the second sensor component to connect to the second display system when the first support frame and the second support frame are folded.

11. The mobile terminal of claim 1, further comprising auxiliary components disposed on the side frame.

12. The mobile terminal of claim 11, wherein the auxiliary components comprise:
a first auxiliary component located on the third side and the fifth side; and a second auxiliary component located on the fourth side or the sixth side.

13. The mobile terminal of claim 1, wherein the side frame is integrated with the first support frame.

14. The mobile terminal of claim 1, wherein the side frame is integrated with the second support frame.

15. The mobile terminal of claim 1, further comprising a speaker disposed on the side frame.

16. The mobile terminal of claim 1, further comprising a battery component, wherein the battery component comprises:
a first battery disposed in the first support frame; and
a second battery disposed in the second support frame.

17. The mobile terminal of claim 1, wherein the first support frame is a rectangular frame and comprising:
a first long side coupled to the side frame; and
a second long side coupled to the bending structure.

18. The mobile terminal of claim 1, wherein the first support frame is a rectangular frame and comprising:
a long side coupled to the bending structure; and
a short side coupled to the side frame.

19. A mobile terminal comprising:
a foldable support frame comprising:
a bending structure comprising:
a first side; and
a second side;
a first support frame coupled to the bending structure and arranged on the first side, wherein the first support frame comprises:
a third side; and
a fourth side;
a second support frame coupled to the bending structure and arranged on the second side, wherein the second support frame comprises:
a fifth side; and
a sixth side;
a side frame fixedly coupled to the first support frame or the second support frame, wherein the side frame is exposed outside an overlapping area of the first support frame and the second support frame when the first support frame and the second support frame are folded using the bending structure;
a first display system disposed on the third side and the fifth side, wherein the first display system is a foldable flexible display system;
a second display system disposed on the fourth side and away from the first display system; and
a sensor component disposed on the side frame,
wherein a first thickness of the side frame is greater than a second thickness of the first support frame, and wherein the first thickness is less than a third thickness of a folded first support frame and second support frame in a direction in which the first display system points to the second display system.

20. A mobile terminal comprising:
a foldable support frame comprising:
- a bending structure comprising:
  - a first side; and
  - a second side;
- a first support frame coupled to the bending structure and arranged on the first side, wherein the first support frame comprises:
  - a third side; and
  - a fourth side;
- a second support frame coupled to the bending structure and arranged on the second side, wherein the second support frame comprises:
  - a fifth side; and
  - a sixth side;
- a side frame fixedly coupled to the first support frame or the second support frame, wherein the side frame is exposed outside an overlapping area of the first support frame and the second support frame when the first support frame and the second support frame are folded using the bending structure;
- a first display system disposed on the third side and the fifth side, wherein the first display system is a foldable flexible display system;
- a second display system disposed on the sixth side and away from the first display system; and
- a sensor component disposed on the side frame,
wherein a first thickness of the side frame is greater than a second thickness of the first support frame, and wherein the first thickness is less than a third thickness of a folded first support frame and second support frame in a direction in which the first display system points to the second display system.

* * * * *

UNITED STATES PATENT AND TRADEMARK OFFICE
CERTIFICATE OF CORRECTION

PATENT NO. : 11,570,290 B2
APPLICATION NO. : 17/271293
DATED : January 31, 2023
INVENTOR(S) : Bo Huang et al.

It is certified that error appears in the above-identified patent and that said Letters Patent is hereby corrected as shown below:

On the Title Page

Item (71) Applicant: "Guangdong (CN)" should read "Shenzhen (CN)"

Item (72) Inventors: "Bo Huang, Guangdong (CN)" should read "Bo Huang, Shanghai (CN)"

Item (72) Inventors: "Weihua Mao, Guangdong (CN)" should read "Weihua Mao, Shanghai (CN)"

Item (72) Inventors: "Peng Zha, Guangdong (CN)" should read "Peng Zha, Shanghai (CN)"

Item (72) Inventors: "Haowen Xu, Guangdong (CN)" should read "Haowen Xu, Shanghai (CN)"

In the Claims

Claim 1, Column 9, Line 33: "first support, frame and" should read "first support frame and"

Signed and Sealed this
Twenty-eighth Day of March, 2023

Katherine Kelly Vidal
*Director of the United States Patent and Trademark Office*